United States Patent [19]
Plowman

[11] 3,862,325
[45] Jan. 21, 1975

[54] METHOD OF COMBATING PLANT FUNGI
[75] Inventor: Richard Edward Plowman, Wokingham, England
[73] Assignee: Imperial Chemical Industries Limited, London, England
[22] Filed: Sept. 1, 1972
[21] Appl. No.: 285,624

[30] Foreign Application Priority Data
Sept. 15, 1971 Great Britain.................... 42940/71

[52] U.S. Cl.................... 424/283, 47/57.6, 424/245
[51] Int. Cl. ............................................. H01n 9/28
[58] Field of Search............................ 424/283, 245

[56] References Cited
UNITED STATES PATENTS
2,436,645   2/1948   Hawkins et al. ................. 260/345.7

OTHER PUBLICATIONS
Pesticide Index, Frear 4th Ed., 1969, pp. 266 and 344, 370.

Primary Examiner—Stanley J. Friedman
Assistant Examiner—Leonard Schenkman
Attorney, Agent, or Firm—Cushman, Darby & Cushman

[57] ABSTRACT

The method of combating seed and soil fungal diseases of plants which comprises providing a fungistatic amount of 4H-5,6-dihydropyran-3-carboxylic acid to the plant seeds or soil for said plants.

5 Claims, No Drawings

METHOD OF COMBATING PLANT FUNGI

This invention relates to processes for combating plant fungi and to antifungal compositions.

According to the present invention we provide a process of combating plant fungal diseases of seed and soil, especially of the orders Ascomycetes and Basidiomycetes, which comprises providing a fungistatic amount of 4H-5,6-dihydropyran-3-carboxylic acid to the roots of plants liable to infestation by such diseases. We further provide plant antifungal compositions comprising as active ingredient 4H-5,6,dihydropyran-3-carboxylic acid.

The aforesaid compound has the structural formula:

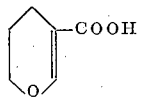

It is a crystalline solid, m.p. 74°C. It is a known compound, and may for example be prepared as set out in U.S. Pat. No. 2,436,645 and Chemical Abstracts 42, P4614d.

This compound shows protectant activity against plant fungal diseases of seed and soil, and is generally effective against plant fungal diseases of the Ascomycetes and Basidiomycetes orders. It is, for example, active against

*Rhizoctonia solani* (sore shin on cotton)
*Fusarium culmorum* (seedling blight of cereals and curcurbits)
*Pythium ultimum* (damping off of peas)
*Helminthosporium graminae* (leaf stripe of barley)
*Helminthosporium sativum* (foot rot of barley)
*Helminthosporium victoriae* (seedling blight of oats)
*Septoria nodorum* (glume blotch)
*Fusarium nivale* (brown foot rot of cereals)
*Verticillium albo-atrum* (wilt of cotton)
*Ustilago nuda* (loose smut of cereals)
*Tilletia caries* (bunt of wheat and rye)

The process of the invention may be carried out using the compound itself, salts thereof, or a derivative reacting chemically to release the compound in the soil, e.g. by hydrolysis. However, most simple derivatives of the compound do not appear to break down in the soil fast enough to be useful. Suitable salts include salts of alkali metals, ammonium and amine salts and the silver salt.

There are two main ways of providing the compound to the roots of plants liable to fungal attack. Plant seeds (or tubers) may be dressed with the compound prior to sowing or the compound may be applied directly to the medium in which plants are growing, or to be grown. Seed-dressing may be carried out by thoroughly mixing or coating the seed with a liquid or solid composition containing the compound. Suitable seed-dressing machines are well known to the art. Sometimes it may be appropriate to steep the seed in an aqueous solution of the compound. Compositions containing the compound may also be applied to soil dirctly, preferably in the form of granules, less preferably as dusts or liquid formulations. Where plants are to be grown in an artificial medium, such as compost, the active ingredient may be pre-mixed with the medium.

Suitable carriers or diluents for use in solid compositions include, for example, kaolin, bentonite, kieselguhr, dolomite, calcium carbonate, talc, powdered magnesia, Fuller's earth, gypsum, Hewitt's earth, diatomaceous earth and China clay. Compositions for dressing seed may comprise an agent assisting the adhesion of the composition to the seed, for example a mineral oil.

Liquid formulations may be solutions, dispersions or emulsions, and may comprise a wetting agent or dispersing agent, e.g of the types listed in U.K. Pat. No. 1,182,584.

The concentration of the active ingredient in compositions of the invention will vary, generally between 0.005 to 80 percent, according to the purpose for which the concentration is intended. Solid seed dressings may generally contain 1 to 30 percent by weight of the active ingredient, typically 5 to 10 percent. Granules for application direct to the soil generally contain from 5 to 50 percent by weight of active ingredient. Liquid seed dressings usually contain from 25 to 80 percent by weight of active ingredient. Where the composition is a medium (such as compost) in which plants are to be grown, it may conveniently contain from 50 to 3,000 parts per million. Dressed seeds conveniently carry from 500 to 3,000 parts per million by weight of the active ingredient.

Compositions of the invention may include other pesticides, e.g. insecticides including chlorinated insecticides, e.g. lindane, chlordecone, endosulphan; phosphorus insecticides, e.g. chlorfenvinphos, pirimiphos ethyl; and carbamates. They may include other antifungal agents, for example, thiram, dithiocarbamates such as maneb, zineb and mancozeb, drazoxolon, carboxin and systemic foliar fungicides such as ethirimol. With some fungicides the compound of the invention shows synergism, for example, with drazoxolon and the related fungicides the subject of U.K. Pat. No. 999,097. Mixtures with mercury fungicides may be useful in certain situations. The compositions of the invention may include nematicides or bactericides, for example 1,3 dihydroxy-2-bromo-2-nitropropane. They may include fertilizers, containing for example the elements nitrogen, phosphorus or potassium.

The fungicidal compositions and processes of the invention are particularly useful because they employ a compound of simple chemical structure which is relatively cheap to manufacture, and which has a relatively broad spectrum of activity against seed and soil borne plant fungal diseases. The compound is relatively non toxic ($LD_{50}$ for rats greater than 1,500 mg/kg). It may therefore find use, alone or in mixtures with other fungicides, as a replacement for mercury fungicides. The latter are extremely toxic, and hazardous to the manufacturer, the user and the environment The invention is illustrated but not limited by the following Examples.

EXAMPLE 1

Compositions containing 4H-5,6-dihydropyran-3-carboxylic acid, the amide and the methyl ester thereof were tested against various soil-borne fungal diseases.

Test against *Pythium ultimum* — Procedure

Approximately 1 gram portions of culture of *Pythium ultimum* maintained on 2 percent malt agar test tube slopes at 20° C are transferred to about 400 grams of sterilized soil containing 5 percent maize meal in a half pint bottle. After 10 to 14 days the inoculated soil is mixed with sterile John Innes seed compost at a rate of 2 bottles to 3½ buckets of 2 gallons capacity. The mixture is moistened and covered and after three days is used as follows. Approximately 100 grams of the mixture is placed into a fibre pot and 10 pea seeds coated 2 days beforehand with chemical under test at the rate of 500 ppm. are sprinkled on the surface of the soil. Another 100 grams of the mixed soil is then placed on top of the seeds and the pot is kept in the greenhouse at between 16° and 22° C. A first count of emergent seedlings is made after 10 days, a week later the seedlings are pulled up and their roots are inspected. Six replicates are conducted; healthy and unhealthy seedlings are counted. Controls wherein untreated seed is used, and also standards wherein seed treated with Thiram are used are simultaneously carried out. Results are presented as a grading (see below).

Test against *Fusarium culmorum* — Procedure

In the test John Innes seedling compost is mixed with a culture of *Fusarium culmorum* grown on mixed soil and cornmeal and the entire mixture then wrapped in brown paper and incubated in the glasshouse for 48 hours. The incubated soil is placed in pots; then seeds (20 per pot) treated with china clay compositions containing the test compound in concentration of 1,000 parts per million are sown in the pots. Seeds treated with "Agrosan" (Trade Mark) mercury seed dressing are used as a standard. "Agrosan" is a mixture of phenyl mercuric acetate and ethyl mercuric chloride. Disease assessments are made 16 days after sowing, and recorded as a grading (see below)

Test against *Rhizoctonia solani* — Procedure

An inoculum of *Rhizoctonia solani* is added to a partially sterilized loam soil, to provide the latter with a 1 percent w/w content of the inoculum. The loam soil is then allowed to stand for 1 week so as to be completely colonised by the disease. The compound is then mixed with the loam soil at a rate of 100 parts per million parts of soil (by weight). After standing for 4 days to allow the chemical to take effect plastic pots are half-filled with untreated, partially sterilized, loam soil and cotton seeds sown on the surface thereof, whereafter the pots are topped up with the treated loam soil. A control experiment is conducted with P.C.N.B. (pentachloronitrobenzene) as standard. The pots are then inspected and assessed 13 days later for disease: results are recorded as a grading (see below).

Test against *Verticillium albo-atrum* — Procedure

The test compound is incorporated into sterile John Innes Seed compost at a rate of 100 parts per million. The soil and chemical are mixed thoroughly in glass powder jars by ball milling in the jars for 20 minutes. The jars are then left to stand for 2 days. Four replicate 1.5 inch diameter disposable plastic pots are half-filled with sterile John Innes Seed Compost and into each pot is placed between six and 10 cotton seeds. The cotton seeds are then covered with the soil with the chemical incorporated. The seeds are then incubated at 30° C for 3 to 4 weeks. A spore suspension of *Verticillium albo-atrum* is prepared and washed twice using sterile water. The spore suspension concentration is then adjusted to give $10^6$ spores per millilitre. The cotton plants in the pots are thinned out to give four plants per pot. One pot of the four replicate pots is then placed on one side to act as a phytotoxic test for the chemical. The plants in the remaining three replicate pots are injected with 0.1 millilitre of spore suspension into the stem vascular tissue, 1 inch above the soil level using a sterile syringe.

Assessments are made on the plants 1 week later. Visual Examination for wilt symptons and brown staining on the vascular tissue is carried out and the number of healthy plants is noted. A control experiment is conducted with benomyl as a standard. Results are recorded in terms of a grading (see below).

Results of the above four tests are given in Table I below.

TABLE I

| Disease | Grading | | |
|---|---|---|---|
| | Acid | Amide | Ester |
| *Pythium ultimum* (500 ppm.) | 3 | 0 | 0 |
| *Fusarium culmorum* (1000 ppm.) | 3 | 0 | 0 |
| *Rhizoctonia solani* (100 ppm.) | 3 | 0 | 0 |
| *Verticillium albo-atrum* (100 ppm.) | 3 | — | — |

| Grading | Significance of Grading |
|---|---|
| 0 | No activity or up to 20% of the disease control given by standard |
| 1 | 20 - 75% of the disease control given by standard |
| 2 | 75 - 99% of the disease control given by standard |
| 3 | Degree of control equal to, or better than, standard. |

EXAMPLE 2

This example illustrates a solid seed dressing composition according to the invention.

| | % wt. |
|---|---|
| 4H-5,6-dihydropyran-3-carboxylic acid | 25% |
| China clay | 73% |
| Mineral oil | 2% |
| | 100% |

EXAMPLE 3

This example illustrates a liquid seed dressing according to the invention.

| | % wt. |
|---|---|
| Potassium 4H-5,6-dihydropyran-3-carboxylate | 40% |
| Water | 60% |
| | 100% |

EXAMPLE 4

A granular composition was prepared by spraying 4-H-5,6-dihydropyran-3-carboxylic acid dissolved in acetone onto pumice granules, the acetone being subsequently allowed to evaporate.

| | % wt. |
|---|---|
| 4H-5,6-dihydropyran-3-carboxylic acid | 5% |
| Pumice granules | 95% |
| | 100% |

EXAMPLE 5

Wheat seeds were dressed by agitation with the composition of example 2 to give an active ingredient loading on the seeds of 1,000 ppm.

Seeds of barley, oats, cotton and cucumbers may be dressed similarly.

EXAMPLE 6

The compound of the invention was tested against *Fusarium nivale* (brown foot rot) on rye.
Test Method Testing is carried out on 70 percent infected Carsten's winter rye stock.

The infected seed is dressed with the test compound at a rate of 100 ppm weight/weight seed. Four replicates each of 20 seeds are planted 1 inch deep in 2½inches diameter plastic pot using John Innes Seed Compost and placed in a glasshouse at 55°F for 4 weeks. The seeds emerging are counted and plants are then assessed for disease symptoms which are yellowing of the leaves and browning of the stems. The plants are often stunted.

The percentage infection is determined and expressed as a percentage of the untreated control. The chemical is then graded on the 0 – 3 scale of Example 1 in comparison with the standard treatments, benomyl at 1,000 ppm and "Agrosan" at 20 ppm.

| Compound | Rate | Grading | Emergence | Healthy Plants % |
|---|---|---|---|---|
| 4H-5,6-dihydropyran-3-carboxylic acid | 1000 | 3 | 77 | 27 |
| Benomyl | 1000 | 3 | 74 | 23 |
| "Agrosan" | 20 | 3 | 74 | 33 |

EXAMPLE 7

The compound of the invention was tested against *Septoria nodorum (glume blotch)) of wheat*.
Test Method.

Testing is carried out on a 60 percent infected stock of Champlein wheat. The procedure followed is otherwise identical to that of Example 6.

Assessment of the disease is made by counting the number emerged and expressing this as a percentage of the untreated control.

| Compound | Rate ppm | Emergence % untreated control |
|---|---|---|
| 4H-5,6-dihydropyran-3-carboxylic acid | 1000 | 130 |
| "Agrosan" | 20 | 154 |

EXAMPLE 8

The compound of the invention was tested against *Helminthosporium victoriae* (leaf stripe) of oats.
Test Method Testing is carried out on a 55 percent infected stock of Forward Oats. The procedure followed is otherwise identical to that of Example 6.

Assessment of the disease is made. The disease symptoms are failure to emerge, stunting of the plants, brown to purplish stripes on the leaves which are sometimes lacerated. The number of plants emerged and the number of diseased plants are counted. A Disease Index is then calculated using the following formula:

Disease Index = 160 − (Number healthy emerged plus Total number emerged.)

The results are then expressed in terms of the Disease Index as a percentage of the disease Index of the untreated control.

| Compound | Rate ppm | Disease Index (% Untreated Control |
|---|---|---|
| 4H-5,6-dihydropyran-3-carboxylic acid | 1000 | 31 |
| "Agrosan" | 20 | 94 |
| Benomyl | 1000 | 100 |

EXAMPLE 9

This Example illustrates a seed dressing containing an additional active ingredient.

| | Weight % |
|---|---|
| 4H-5,6-dihydropyran-3-carboxylic acid | 5% |
| Drazoxolon | 5% |
| China clay | 88% |
| Mineral Oil | 2% |
| | 100% |

In trials against seedling blights of wheat in Australia, this mixture showed synergism; that is to say, it gave better results than equivalent amounts of either constituent of the mixture used separately.

I claim:

1. A method of combating fungal diseases of plants which comprises applying a fungistatic amount of 4H-5,6-dihydropyran-3-carboxylic acid to plant seeds or to the soil for said plants.

2. The method of claim 1 wherein the 4-H-5,6-dihydropyran-3-carboxylic acid is applied as a salt selected from the group consisting of the alkali metal, ammonium, amine and silver salt.

3. The method of claim 1 wherein the 4-H-5,6-dihydropyran-3-carboxylic acid is applied to the plant seeds prior to sowing.

4. The method of claim 3 wherein the seeds are cereal seeds.

5. The method of claim 3 wherein the seeds are cotton seeds.

* * * * *